Aug. 22, 1961 G. E. NELSON 2,997,666
PULSE AMPLITUDE TO PULSE DURATION CONVERTER
Filed April 15, 1959
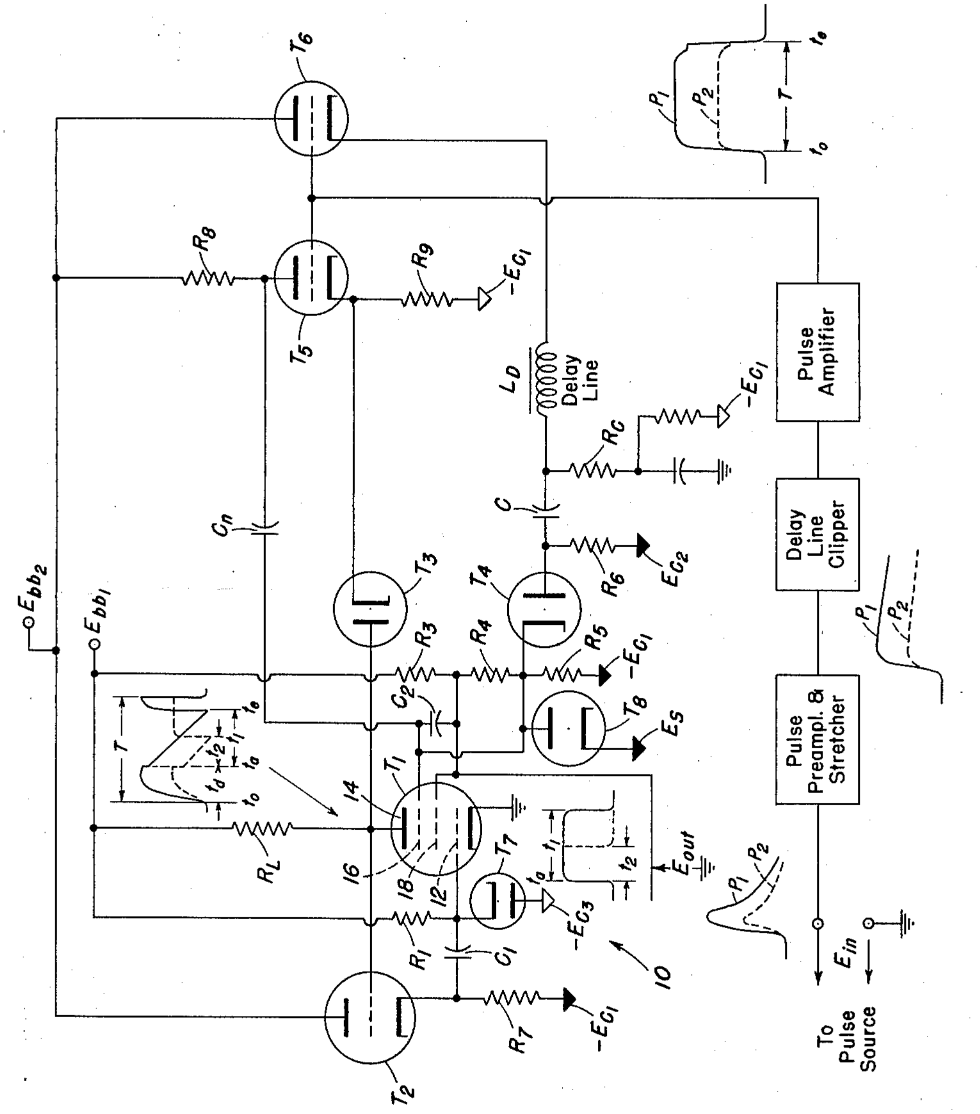
INVENTOR
Gordon E. Nelson
BY Eldon H. Luther
ATTORNEY United States Patent Office 2,997,666

Patented Aug. 22, 1961

2,997,666

PULSE AMPLITUDE TO PULSE DURATION CONVERTER

Gordon E. Nelson, Windsor, Conn., assignor to Combustion Engineering, Inc., New York, N.Y., a corporation of Delaware Filed Apr. 15, 1959, Ser. No. 806,512

7 Claims. (Cl. 332—1)

This invention relates to a circuit for the accurate conversion of each pulse, in an evenly or randomly distributed pulse train (in time) into another pulse the amplitude of which is constant with the other converted pulses in the train and the pulse duration of which is proportional to the amplitude of the original pulse train which has an assortment of amplitudes.

Briefly stated, the invention involves a phantastron circuit which is controlled in a particular manner so that the output, i.e., the signal on the screen of the phantastron, is a pulse train each pulse within which train has a one for one relation to the original, randomly distributed or irregular pulse train and the width of the pulses on the screen are proportional of the amplitude of said irregular pulses. The operation and make up of phantastron type circuits are well known with reference here being made to the description set out in pages 195 through 200 of "Wave Forms" volume 19, by Chance et al. In these phantastron type circuits, when a trigger is applied to the tube (i.e. suppressor grid) a linearly descending ramp voltage is produced at the plate as a result of the Miller integrator feed-back action that takes place. At the same time a positive flat top pulse is produced at the screen of the tube with the duration of the pulse being that of the linear ramp. Upon the ramp voltage reaching the knee of the curve of the particular tube the voltage flies back and the flat top pulse on the screen is terminated. The duration or period of the ramp is proportional to the starting voltage at the plate. In the present invention pulses irregular in amplitude and time distribution are first shaped so as to produce rectangular pulses of a predetermined period with the amplitude of the pulses varying in accordance with and proportionally to the amplitude of the original pulse. The rectangular pulse is coupled to the plate of the phantastron through a cathode follower and then a plate catching diode such that the potential on the plate of the phantastron may rise to but not above the output of the cathode follower, which is proportional to the rectangular input thereto, and with the voltage on the plate of the phantastron being allowed to freely fall below this control voltage. The rectangular pulses also trigger the phantastron but at a time that is delayed with respect to the control voltage or signal appearing at the plate of the phantastron. The triggering action is accomplished by coupling the rectangular pulses to the grid of another cathode follower in the cathode circuit of which is provided a delay line. This delay line delays the output signal of this follower relative to the input sufficiently to assure that the voltage at the plate of the phantastron is raised to its flat top value before the phantastron is triggered. This delayed output is passed through a differentiator and then to the suppressor where it appears as a sharp positive trigger pulse. Thus the constant amplitude pulses appearing at the screen of the phantastron have width which varies with the control voltage and accordingly is proportional to the amplitude of the irregular pulse.

It is an object of this invention to provide an improved circuit for converting an amplitude varying pulse or pulse train to a constant amplitude, pulse duration varying train of flat top pulses.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein the single figure is a circuit of the invention.

The invention will now be described in detail with the aid of the drawing, wherein the phantastron circuit is indicated generally as 10 and includes the pentode $T_1$ which has control grid 12 connected with plate 14 through capacitor C1 and cathode follower $T_2$. When no gate is applied, suppressor grid 16 is biased to cut off, grid 12 is substantially at the potential of the cathode and substantially all of the current is flowing to screen 18. When a trigger is applied to suppressor grid 16 the current path switches from the screen 18 to plate 14 and the ramp is initiated through the Miller integrator action. Suppressor 16 is connected with screen 18 through C2 and then to the juncture of $R_3$ and $R_4$ which together with $R_5$ act as a voltage divider network and with this circuitry being effective to maintain suppressor 16 gated on until the plate voltage is run down to the bottom of the ramp. In accordance with the invention, the phantastron is controlled so as to provide pulses of constant amplitude, the duration (width) of which is directly proportional to the amplitude of an input pulse. This is accomplished by controlling (through a plate catching diode) the starting potential of the phantastron circuit such that the starting potential is proportional to the height of the input pulse. The width of the pulse appearing at the screen (output) of $T_1$ of the phantastron circuit will be proportional to the starting potential which in turn is proportional to the height of the input pulse. This is true because the length of the ramp generated at the plate is determined by (and proportional to) the starting potential at the plate.

To secure the proper control over the pulse width at the output, the input pulse must be shaped to form a rectangular pulse whose amplitude is proportional to the input pulse and whose width is large enough to enable the plate of the phantastron to rise to the (flat top) voltage of the controlling pulse and allow the ramp run down to be completed and return to the controlling voltage. The pulse is shaped into the rectangular waveform by stretching the pulse with a large time constant in the preamplifier and clipping the long tail of the stretched pulse with a shorted delay line. The rectangular pulse is further amplified and fed to the grid of $T_5$ and $T_6$. The cathode of the $T_5$ changes its voltage from a voltage close to the base line of the pulse (at grid) to a value very close to the value at the top of the pulse. The potential of the cathode of plate catching diode $T_3$ moves from the base line to the "flat top" value. The potential at the plate of $T_1$ is thus released from the base line value and is again caught at the "flat top" potential as the plate attempts to rise to the supply potential $Ebb1$.

Since the plate of $T_1$ requires a finite time to reach the flat top potential, some delay in initiating the rundown is introduced. The phantastron is triggered by the shaped pulse train but the trigger pulse appearing at the suppressor grid of $T_1$ is delayed by an amount $t_d$ relative to the application of a pulse to the plate. The positive trigger pulse arrives at the suppressor grid of $T_1$ through the clamping diode $T_4$, the $R_6C$ differentiating circuit, the delay line and cathode follower $T_6$ where the cathode rises with the grid potential reproducing the input (to grid of $T_6$) waveform at the cathode. The delay line $Ld$ delays the pulse by an amount $t_d$. The delay line terminates in resistor $Rc$ equal to the characteristic impedance of the delay line to prevent distortion due to reflection. The $R_6C$ circuit differentiates the pulse. The diode $T_4$ clamps the suppressor grid at $E_{c2}$ permitting the transfer of the positive pulse to the suppressor grid (superimposed on $E_{c2}$) after $t_d$ seconds have elapsed from time $t_0$. At the instant ($t_a$) the positive pulse at the suppressor grid causes plate current to flow resulting in a transfer of current from the screen to plate and initiating the ramp by virtue of the Miller integrator feed-back effect from plate of $T_1$ through cathode follower $T_2$, $R_7$.

When the transfer of the tube current from screen to plate in the phantastron takes place, the resulting rise in screen potential tends to prevent the suppressor from returning to its former potential initially due to $C_2$ coupling the suppressor and the screen grids and finally due to a rise in potential at the junction of $R_4$ and $R_5$ when screen current was greatly reduced in $R_3$.

The RC constants (R1C1) determines the slope of the negative ramp generated at the plate of $T_1$ and $T_2$ enables the plate voltage of $T_1$ to return to the plate clamping voltage quickly through quick recharge of $C_1$ by way of the low resistance path of $R_7$. $E_{c3}$ is selected such that control grid 12 of $T_1$ can never be driven to cut off the tube completely as would be the case at time $t_e$ when the control rectangular pulse returns to base line. This is done by clamping the diode to this potential so that $T_7$ conducts (low resistance path) whenever potential grid 12 begins to go more negative than $E_{c3}$.

To prevent the suppressor from going positive during the initial rapid rise in plate voltage due to plate to suppressor capacitance, plate resistor $R_8$ and coupling capacitor $Cn$ are used to neutralize the effect of inter-electrode capacitance. This is achieved by introducing a signal equal and opposite to that transferred to the suppressor grid from the plate. Since the voltage at the plate of $T_4$ will fall with rising grid signal (and cathode signal) the polarity is correct for neutralizing. This plate voltage signal results from $R_8$ in the plate circuit with $R_8$ being much smaller than cathode resistor $R_9$.

In brief, the input pulses are shaped to form a rectangular waveform and amplified with the period of these shaped pulses being constant and greater than $t_d+t_1$, encountered for the wave of maximum amplitude. The amplitude of each shaped pulse (proportional to input pulse) determines the potential of the voltage to which the plate of the phantastron is elevated through the use of the plate catching diode, this potential in turn being the starting potential. To prevent triggering along the rising edge of the controlling pulse, the pulse is delayed before reaching the suppressor (and screen) grid where it triggers the phantastron into the state for generating the ramp. Also to prevent triggering prematurely, a negative (neutralizing) pulse is introduced at the suppressor grid at the instant the plate is rising to the control voltage.

By converting the irregular amplitude varying pulse train into a train of constant amplitude, rectangular pulses of varying pulse width the pulse train can be readily averaged by an averaging circuit and also can be readily totalized and with there being precise accuracy resulting from the phantastron circuit.

In the drawings the solid line wave forms represent the effect produced by the initial pulse $P_1$ and the dotted line wave forms represent the effect provided by $P_2$. $P_2$ is about half of $P_1$ and it will be noted that the output wave (at screen) period conforms with this $t_2$ being half of $t_1$.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What is claimed is:

1. In an organization of the type described a phantastron circuit, pulse shaping means operative to change an amplitude varying train of pulses of irregular form into rectangular pulses of proportionally varying amplitude, means coupling said pulse train to the plate of the phantastron as positive going pulses and means coupling said pulse train to the suppressor grid of the phantastron also as positive going pulses but at a delay relative to the plate coupling such that the voltage of the plate is at the flat top value for the pulse before the phantastron is triggered.

2. A pulse amplitude to pulse duration converter comprising pulse shaping means operative to convert an irregular, amplitude varying pulse train into a pulse train of positive going rectangular pulses proportional in amplitude to each original pulse, a phantastron circuit, means coupling said rectangular pulses to the plate of the phantastron as positive going pulses, proportional therewith, and means responsive to said pulses to trigger the phantastron whereby the negative going plate voltage ramp is initiated at a voltage proportional with the flat top voltage of the rectangular pulse and the witdh of the constant amplitude pulse at the plate of the phantastron will be proportional to the amplitude of the initial pulse, said last named means including a delay line operative to delay triggering of the phantastron.

3. A pulse amplitude to pulse width converter of precise accuracy comprising a phantastron circuit, means operative to shape an irregular, amplitude varying pulse train into a pulse train of amplitude varying rectangular pulses and couple the same to the plate of the phantastron as positive going pulses the width of which is greater than the duration of the phantastron for the maximum plate voltage that is to be encountered, additional means effective to couple said pulses to the suppressor of the phantastron to trigger the same, this latter coupling being through a delay line and a differentiator effective respectively to delay the application of the trigger until the plate has risen to the flat top voltage of the pulse and to provide a sharp pulse for triggering.

4. The organization of claim 3 wherein the pulse train is coupled to the plate of the phantastron through a cathode follower and to the suppressor through a cathode follower.

5. In combination, a phantastron circuit, a first cathode follower coupled to the plate of the phantastron through a plate catching diode such that the plate of the phantastron varies in accordance with positive going rectangular pulses applied to the grid of said follower, a load in the plate circuit of said follower that is small compared with that in the cathode circuit, the plate of said follower being capacitively coupled to the suppressor of the phantastron to neutralize the effect on said suppressor of plate voltage variations due to said pulses, another cathode follower to the grid of which said pulses are applied, a delay line in the cathode circuit of said other follower such that the output signal of said other follower is delayed by at least the time interval required for the plate of the phantastron to rise to flat top value of the pulse, the output of said other cathode follower being coupled to the suppressor of the phantastron through a differentiator.

6. In an organization of the type described a circuit that includes a pentode and which is operative in response to a positive trigger applied to the suppressor grid to produce a linearly declining ramp plate voltage which declines to a predetermined low value and then flies back and a positive pulse of constant amplitude on the screen thereof the duration of which is that of the ramp, means coupling a train of rectangular pulses to the plate of the pentode so the pulses produce flat top positive going pulses at the plate and the pulse duration of which is greater than the maximum pulse duration of the ramp produceable by the pulses, with this means including a cathode follower to the grid of which said pulses are applied and the output of which is coupled to said plate through a plate catching diode, and means triggering said circuit by said pulses and including another cathode follower the grid of which receives said pulses of the train, the output of said other cathode follower including a delay line so the signal in this output is delayed with respect to that on said plate by an interval at least that required for the plate to rise to the flat top value of the pulse, and means including a differentiator coupling this delayed output to said suppressor.

7. The organization of claim 6 wherein the plate circuit of the first mentioned cathode follower develops a signal inverse to that on the grid and is capacitively coupled to said suppressor grid to neutralize the effect of interelectrode capacitance between the plate and suppressor of the pentode.

References Cited in the file of this patent

UNITED STATES PATENTS

| | | |
|---|---|---|
| 2,163,939 | Dillenburger | June 27, 1939 |
| 2,673,331 | Liguori | Mar. 23, 1954 |